Figure 1:
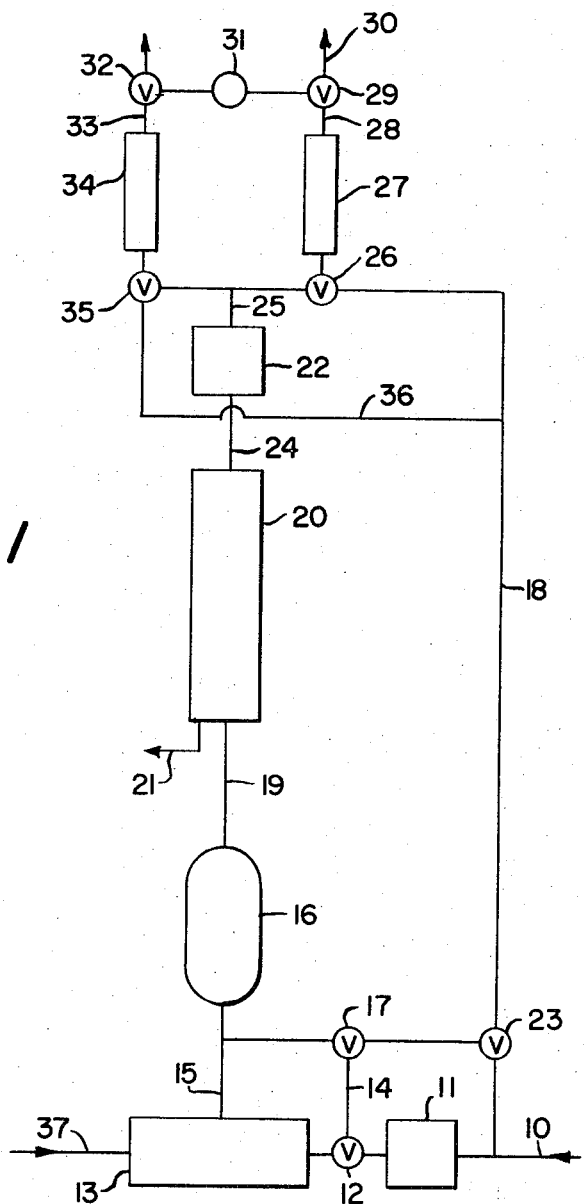

United States Patent [19]

Fornoff et al.

[11] 3,829,560

[45] Aug. 13, 1974

[54] RECOVERY OF SULFUR DIOXIDE FROM GAS STREAMS

[75] Inventors: Louis L. Fornoff, Cedar Grove, N.J.; John J. Collins, Katonah, N.Y.; Rolla D. Taylor, North Ridgeville, Ohio

[73] Assignee: Union Carbide Corporation, New York, N.Y.

[22] Filed: June 14, 1972

[21] Appl. No.: 262,561

[52] U.S. Cl................... 423/522, 423/533, 423/539
[51] Int. Cl............................................. C01b 17/72
[58] Field of Search......... 423/522, 533, 539; 55/75

[56] References Cited
UNITED STATES PATENTS
3,363,401   1/1968   Jean Pierre et al.................. 423/573

3,615,197   10/1971   Jaeger................................ 423/533

OTHER PUBLICATIONS

Chem. Abstracts, Vol. 70, 1969, 118395f.

*Primary Examiner*—Oscar R. Vertiz
*Assistant Examiner*—Gregory A. Heller
*Attorney, Agent, or Firm*—Richard G. Miller

[57] ABSTRACT

Sulfur dioxide in the effluent from the acid absorber of a contact process sulfuric acid plant is adsorbed in a fixed bed of molecular sieve adsorbent, purged from the adsorption bed with hot dry oxygen-containing gas and recycled to a catalytic converter in admixture with the oxygen-containing purge gas for conversion to sulfur trioxide and consequent reaction with water to form sulfuric acid.

4 Claims, 3 Drawing Figures

RECOVERY OF SULFUR DIOXIDE FROM GAS STREAMS

The present invention relates to the production of sulfuric acid by the method generally known as the contact process, and, more particularly, it relates to the utilization for sulfuric acid formation of sulfur dioxide which passes through the acid adsorber unit and heretofore has been lost in the vent gas from the plant.

In the contact process for the production of sulfuric acid, a gas stream containing sulfur dioxide and free oxygen is converted by contact with a catalyst according to the strongly exothermic reaction $$2 SO_2 + O_2 \rightleftharpoons 2 SO_3$$

Generically, sulfuric acid plants in which sulfur dioxide and oxygen are converted to sulfur trioxide in contact with a solid catalyst are contact processes whether or not the sulfur dioxide production is integrated with the particular plant. In those cases in which sulfur dioxide is formed by burning elemental sulfur, metal sulfides, hydrogen sulfide or carbonaceous sludges of spent sulfuric acid, it is common practice to have these combustions thermally integrated with the process for converting sulfur dioxide to sulfuric acid. Copper converter gas, smelter and various sulfate decomposition by-product gases and sulfur dioxide itself are examples of off-site production processes not thermally integrated into the sulfuric acid production process. The $SO_2$ and oxygen gas mixture fed to the catalytic converter to form $SO_3$ is, as a general practice, first purified with respect to any entrained materials harmful to the conversion catalyst or the apparatus employed. These impurities are most commonly dust particles, particularly where an ore burner is employed to produce the $SO_2$, and $H_2O$. Electrostatic dust collectors are frequently used to remove dust for this purpose and a portion of concentrated sulfuric acid product is commonly used as an effective desiccant. The converter in the contact process has always used either a platinum or vanadium catalyst since they are the only known materials providing commercially feasible conversion rates. At present the most commonly used are the vanadium based materials which are complex compositions containing vanadium in the oxidation state corresponding to vanadium pentoxide ($V_2O_5$). Depending upon the particular catalyst mass employed and the conposition of the $SO_2$-containing feed stream, the converter can comprise one or a plurality of stages operated at various temperature conditions to achieve optimum $SO_3$ production. In the converter the reaction $$2 SO_2 + O_2 \rightleftharpoons SO_3$$

can be made to go almost, but not completely, to the sulfur trioxide product side at temperatures of below 700°F. at very slow reaction rates. Higher temperatures increase the reaction rates, but the reaction equilibrium is shifted toward increasing concentrations of sulfur dioxide. In the commercial practice of the contact process the economic balance between increasing the reaction rate and decreasing the equilibrium toward the sulfur trioxide product side of the reaction is the controlling factor with the result that the effluent gas from the catalytic conversion stage has an appreciable content of sulfur dioxide. The sulfur dioxide passes through the acid absorber (scrubber) and exits in the vent gas from the sulfuric acid plant as impurity and lost sulfur reactant, or the effluent from the scrubber is fed to another catalytic converter to convert some of the $SO_2$ to $SO_3$ and consequent production of additional sulfuric acid in another acid absorber. In this latter case, the emission and loss of $SO_2$ into the atmosphere via the plant vent gas is still several hundred parts per million.

It is, therefore, the general object of this invention to remove the sulfur dioxide impurity from the sulfuric acid plant vent gas and recycle it in an effective and efficient manner for the production of sulfuric acid with minimal venting of sulfur dioxide into the atmosphere.

The process of the present invention can be used to remove sulfur dioxide from the vent gas and utilize it for the production of sulfuric acid in any contact type process. Essentially, the improved results are due to the use of a fixed bed of a crystalline zeolitic molecular sieve adsorbent to which a substantial portion, preferably all, of the gaseous effluent from the acid absorber is fed prior to atmospheric venting. The molecular sieve adsorbent bed effectively adsorbs water and sulfur dioxide and is capable of reducing the $SO_2$ concentration in the effluent or vent gas to about 50 ppm or less. The adsorption bed is periodically desorbed of $SO_2$ and $H_2O$ using a dry, hot, oxygen-containing nonsorbable purge gas and the $SO_2$-containing effluent, preferably dehydrated, is recycled to a converter for conversion to $SO_3$ and subsequent formation of additional sulfuric acid.

The purge gas, in addition to oxygen, can comprise nitrogen and any of the inert gases, i.e., helium, neon, argon and the like and carbon dioxide. Water as an impurity, can be present in an amount of not greater than 100 ppm in the purge gas. Other impurities such as carbon monoxide, hydrogen and hydrocarbons are preferably kept to minimum practical concentration levels since they consume oxygen in the converter and tend to inhibit conversion of $SO_2$ to $SO_3$ therein. The oxygen content of the purge gas can range from a lower limit of that of the effluent from the molecular sieve absorber during the adsorption stroke up to essentially pure oxygen. Preferably the oxygen content of the purge gas is such that the $SO_2$-containing effluent from the adsorption bed during $SO_2$ desorption contains the proportion of oxygen and $SO_2$ for optimum conversion of $SO_2$ to $SO_3$ in the catalytic converter. The proper oxygen concentration is dependent upon a number of factors such as the particular catalyst used in the converter, the temperature of the catalyst mass, and the like and thus cannot be stated with mathematical precision. The concentration value can readily be determined, however, by routine methods for any given process system.

The crystalline zeolitic molecular sieve employed in the $SO_2$ adsorption unit can be any which has a pore diameter large enough to adsorb $SO_2$, i.e., at least 4 Angstroms. Preferably, the zeolite has a high capacity for $SO_2$ and is resistant toward crystal degradation by contact with acids. Illustrative of the molecular sieves suitably employed are zeolite A, U.S. Pat. No. 2,882,243; zeolite X, U.S. Pat. No. 2,882,244; zeolite R, U.S. Pat. No. 3,030,181; zeolite S, U.S. Pat. No. 3,054,657; zeolite T, U.S. Pat. No. 2,950,952; zeolite F, U.S. Pat. No. 2,996,358; zeolite B, U.S. Pat. No. 3,008,803; zeolite Q, U.S. Pat. No. 2,991,151; zeolite M, U.S. Pat. No. 2,995,423; zeolite H, U.S. Pat. No.

3,010,789; zeolite J, U.S. Pat. No. 3,011,809; zeolite Y, U.S. Pat. No. 3,130,007; zeolite L, U.S. Pat. No. 3,216,789; zeolite K-G, U.S. Pat. No. 3,056,654 and synthetic mordenite. Naturally occurring zeolites suitably employed are chabazite, gmelinite, mordenite, erionite, offretite, clinoptilolite, phillipsite and faujasite. The foregoing zeolites can be utilized in the cation form in which they are produced synthetically or occur naturally or in their cation exchanged forms which are well known in the art.

Because the $SO_2$ which passes through the acid absorber unit is collected in the molecular sieve adsorption bed, it is available for further treatment upon desorption in a more concentrated form than in the gas stream from which it was isolated. This significant feature of the present invention provides great flexibility in dealing with atmospheric pollution problems and, accordingly, a number of embodiments are advantageously illustrated hereinafter for a better understanding of the invention.

EXAMPLE I

This example illustrates an embodiment of the present process in which the total sulfur dioxide recovered from the effluent from a contact process acid absorber (scrubber) is recycled to the same catalytic converter through which it initially passed. The embodiment, in providing for atmospheric venting of tail gas only through a molecular sieve adsorbent bed, affords maximum environmental pollution control. The process system is described with reference to FIG. 1 of the drawings. As shown therein, air is introduced into the system through line 10 which passes the air stream into dryer 11 containing concentrated sulfuric acid. A portion of the dried air leaving drier 11 is fed via valve 12 into furnace 13 and the remainder of the dried air stream is passed into line 14. Simultaneously, sulfur is passed through line 37 into furnace 13 where it is burned with oxygen from the air therein to form sulfur oxides, principally $SO_2$. The combustion products and residual nitrogen and oxygen leave the furnace 13 through line 15 and are combined with additional dry air from line 14 via valve 17 to enter catalytic converter 16 which contains a vanadium based catalyst at elevated temperature. Also entering converter 16 through line 18 valves 17 and 23 and line 15 is a gas stream containing oxygen, $SO_2$ and nitrogen, the origin of which is provided infra. The effluent from converter 16 is essentially $SO_3$, oxygen, nitrogen and a small quantity of unconverted $SO_2$. This effluent is conducted through line 19 to acid absorber 20 where the $SO_3$ is contacted by aqueous sulfuric acid and is converted to sulfuric acid by reaction with water. Product sulfuric acid is removed from the said absorber through line 21. The gaseous effluent from acid absorber 20 is composed of oxygen, nitrogen, sulfur dioxide and water vapor and has entrained therein small droplets of sulfuric acid. These droplets are substantially removed in demister 22 after the effluent from acid absorber 20 has passed through line 24. From demister 22 the gas stream is passed through line 25 and valve 26 into adsorption bed 27 which contains activated zeolitic molecular sieve crystals. Substantially all of the water and sulfur dioxide are adsorbed in bed 27 and the non-adsorbed constituents, i.e., oxygen, nitrogen and trace quantities of sulfur dioxide and water vapor are conducted out of the bed 27 through line 28 and valve 29. A portion of the gas stream passing through valve 29 is vented to the atmosphere and through line 30 and the remaining portion is fed through heater 31 and is thereafter used as the hot purge gas stream to desorb water and sulfur dioxide previously adsorbed in molecular sieve adsorbent bed 34 in the same manner as bed 27 is presently being utilized. The hot purge gas passes through valve 32, line 33 countercurrently through bed 34 and exits through valve 35 carrying desorbed water and sulfur dioxide through line 36 to line 18. If at any time the water concentration of the effluent from bed 34 in line 18 is undesirably high to enter converter 16, the gas stream can be directed via valve 23 to line 10 and dehydrated in dryer 11 before being introduced into the furnace 13 and/or converter 16 in the same manner as the air stream introduced into the system through line 10. If the water concentration is sufficiently low, the gas stream from line 18 can be fed directly to converter 16. The following table indicates typical operating conditions in various parts of the process system. The numbered parts in the table correspond to the numbered parts in FIG. 1.

Table I

| | Part | 24 | 25 | 28 | 30 | 33 | 36 |
|---|---|---|---|---|---|---|---|
| | Temperature, °F. | 180 | 100 | 110 | 110 | 120/550 | 125/525 |
| Gas | % $SO_2$ (or ppm) | 0.30 | 0.30 | <50ppm | <50ppm | <50ppm | 1.5% |
| Stream | % oxygen | 6.3 | 6.3 | 6.4 | 6.4 | 6.4 | 6.1 |
| Compo- | % nitrogen | 93.4 | 93.4 | 93.6 | 93.6 | 93.6 | 92.4 |
| sition | PPM $H_2O$ | 20–100 | 10–40 | <1 | <1 | <1 | 80–400 avg. |
| | PPM $H_2SO_4$ | 60 | 1.5 | <1 | <1 | <1 | <1 |
| | Acid Mist, mg/cuft | 2–20 | <0.1 | <0.1 | <0.1 | <0.1 | <0.1 |
| | Flow Rate, SCFM | 15,000 | 15,000 | 14,995 | 11,955 | 3,000 | 3,045 |

The process embodiment of this example is advantageously employed where the concentration of oxygen in the effluent from the acid absorber is sufficient, i.e., greater than 6 volume percent, for use as the oxygen-containing purge gas used to desorb the molecular sieve adsorption beds, and where it is convenient to limit the sulfur dioxide produced for feed to the catalytic converter in order that the catalytic converter can accommodate efficiently the additional sulfur dioxide load imposed on it by the recycle of sulfur dioxide from the molecular sieve adsorption beds.

In the circumstance where stack gas from the acid absorber of a contact process system is too low in oxygen concentration for ultimate recycle to a catalytic converter, the purge gas used to desorb sulfur dioxide and water from the molecular sieve beds can comprise dry ambient air. The process embodiment of the following example provides an efficient means of drying air for use as purge gas. The molecular sieve dryers employed are integrated into the overall process so that the dryers can be periodically regenerated without difficulty.

EXAMPLE II

Figure 2:
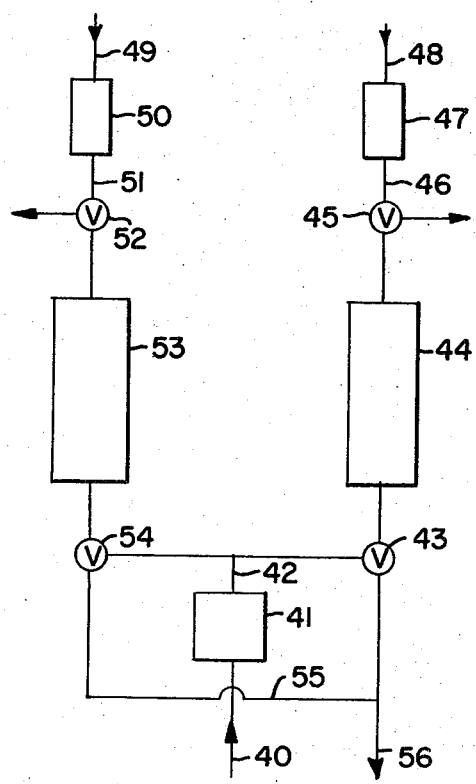

The flow diagram which is FIG. 2 of the drawings illustrates the sulfur dioxide recovery unit which receives stack gas from a conventional contact process acid absorber, such as described in Example I, and ultimately recycles oxygen and sulfur dioxide to a catalytic converter unit. With reference to FIG. 2, stack gas from an acid absorber is passed through line 40 and through demister 41. The gas stream emerging from demister 41 comprises water vapor, $SO_2$, nitrogen and a low concentration of oxygen, and is fed via line 42 and valve 43 to molecular sieve adsorption bed 44 wherein water vapor and the sulfur dioxide are selectively adsorbed. The effluent gas stream from adsorption bed 44 is dry and comprises principally of nitrogen and a small amount of oxygen. This effluent passes through valve 45 which directs all or a desired portion thereof through line 46, and adsorption bed 47 containing a desiccant, preferably a zeolitic molecular sieve. Bed 47 in a previous phase of the operation of the process contains water adsorbed from an ambient air stream introduced through line 48. During the present phase of operation, this water is desorbed from bed 47 by the purging action of hot dry gas stream flowing through from line 46. Simultaneously an ambient air stream is introduced through line 49 to adsorption bed 50 containing crystalline zeolite A as a desiccant. Water vapor is selectively adsorbed on the bed and the effluent very dry air stream is passed via line 51, valve 52, adsorption bed 53, which in a prior phase of the process performed the same sulfur dioxide and water adsorbing function as bed 44 is in the present phase of operation. The oxygen-containing purge gas stream from bed 53 carries desorbed $SO_2$ and water through valve 54, line 55 and line 56 indirectly or directly, depending upon the water content, to a catalytic converter.

The following table indicates typical operating conditions in various parts of the process system. The numbered parts in the table correspond to the numbered parts of FIG. 2.

Table II

| | Part | 40 | 42 | 46 | 48 | 49 | 51 | 56 |
|---|---|---|---|---|---|---|---|---|
| | Temperature, °F. | 100 | 100 | 120/150 | 125/475 | 10 | 110 | 125/150 |
| Gas | $SO_2$ | 0.25% | 0.25% | <50ppm | <50ppm | 0 | 0 | 0.83avg. |
| Stream | oxygen, % | 7.5 | 7.5 | 7.5 | 7.5 | 20.9 | 21.0 | 20.9 |
| Compo- | nitrogen, % | 92.25 | 92.25 | 92.5 | 89.8 | 77.4 | 79.0 | 78.2 |
| sition | | | | | | | | 40-140 |
| | $H_2O$, ppm | 20-100 | 10-40 | <1 | 2.7%avg. | 1.7% | <1 | avg. |
| | Acid Mist, mg/cuft | 2-20 | <0.1 | <0.1 | <0.1 | <0.1 | <0.1 | <0.1 |
| | Flow Rate, SCFM | 15,000 | 15,000 | 4,500 | 4,620 | 4,575 | 4,500 | 4,540 |

Since water removed from the ambient air is quite pure, it is desirable to utilize this water in the system to react with $SO_3$ to form sulfuric acid. It is, therefore, a preferred modification of the embodiment of Example 2 to first remove a substantial portion of the water vapor from the ambient air by passage through a sulfuric acid dryer or refrigeration unit prior to passage through one of the molecular sieve-containing dryers identified by numbers 47 and 50 in FIG. 2. This method also decreases substantially the purge gas requirements to regenerate the molecular sieve adsorbent beds 47 and 50.

Because the $SO_2$ adsorption and recycle concept of the generic process of the present invention is so effective in reducing the quantity of $SO_2$ ultimately discharged into the atmosphere, it is possible to integrate two or more contact process systems in such a manner that only one molecular sieve adsorption unit is required to reduce the concentration of $SO_2$ vented from all of the integrated systems to acceptable levels. In addition to the more favorable economics achieved, the integration has other advantages, particularly where at least one of the systems employs by-product $SO_2$ as the raw material for sulfuric acid production. An embodiment of this kind of integrated process is illustrated in the following example:

EXAMPLE III

Figure 3:
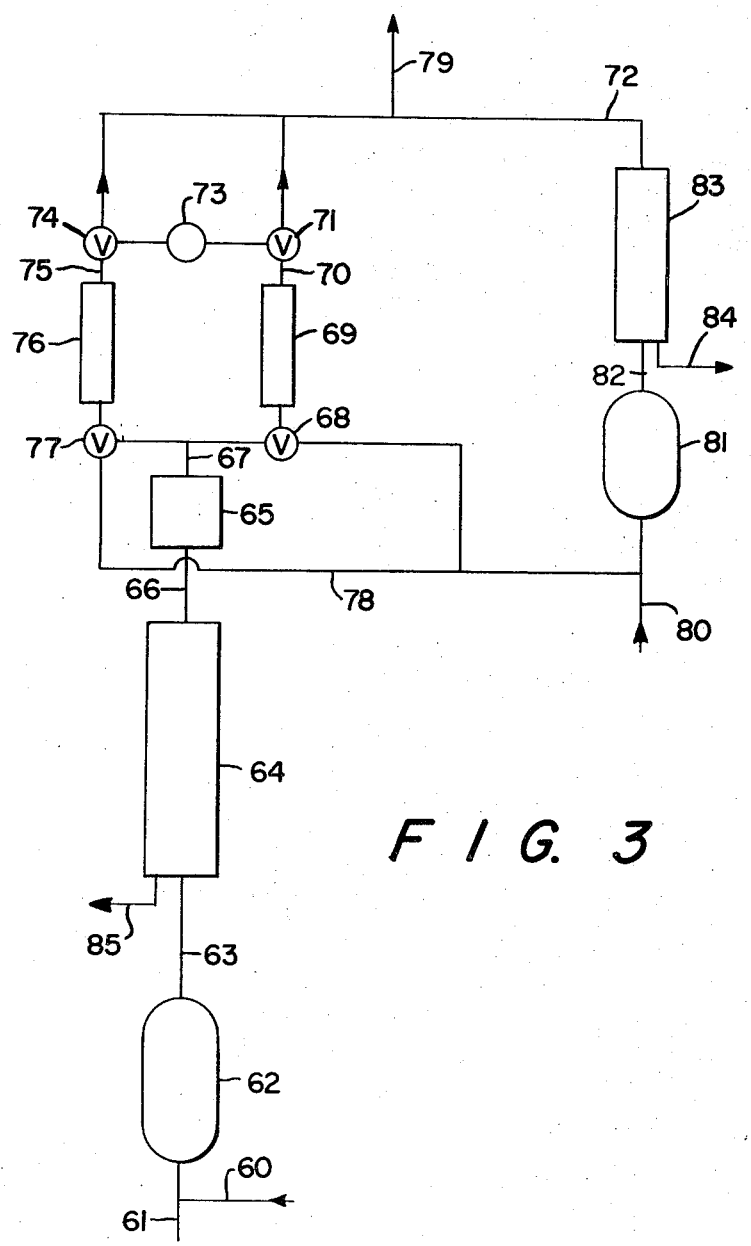

With reference to FIG. 3 of the drawings, dry air and sulfur dioxide from an iron pyrites smelter unit (not shown) enter catalytic converter 62 through lines 60 and 61, respectively. The product $SO_3$ from the converter along with $SO_2$, oxygen and nitrogen pass through line 63 to acid absorber 64 where the $SO_3$ is contacted by aqueous sulfuric acid and is converted to sulfuric acid by reaction with water. Product sulfuric acid is removed from the acid absorber through line 85. The gaseous effluent from acid absorber 64 is composed of oxygen, nitrogen, sulfur dioxide and water vapor and has entrained therein small droplets of sulfuric acid. These droplets are substantially removed in demister 65 after the effluent from acid absorber 64 has passed through line 66. From demister 65 the gas stream is passed through line 67 and valve 68 into adsorption bed 69 which contains activated zeolitic molecular sieve crystals. Substantially all of the water and sulfur dioxide are adsorbed in bed 69 and the non-adsorbed constituents, i.e., oxygen, nitrogen and trace quantities of sulfur dioxide are conducted out of the bed 69 through line 70 and valve 71. A portion of the gas stream passing through valve 71 is passed to the manifold 72 and the remaining portion is fed through heater 73 and is thereafter used as the hot purge gas stream to desorb water and sulfur dioxide previously adsorbed in molecular sieve adsorbent bed 76 in the same manner as bed 69 is presently being utilized. The hot purge gas passes through valve 74, line 75 countercurrently through bed 76 and exits through valve 77, carrying desorbed water and sulfur dioxide through line 78 and into converter 81. Also entering converter 81 through line 80 is another gas stream which is the effluent from another contact process acid absorber after being treated in a demister to remove liquid acid droplets. This effluent is composed of oxygen, nitrogen, water vapor and sulfur dioxide. The combined gas streams from lines 78 and 80 are passed into an auxiliary catalytic converter 81 for oxidizing a large percentage of the $SO_2$ to $SO_3$. The effluent from converter 81 is then in conventional manner passed through line 82 to an auxiliary acid absorber 83. Product acid is taken from line 84. The effluent from absorber 83 contains several times as much $SO_2$ as that entering manifold 72 from molecular sieve bed 69. The capacities of the integrated units, however, can be matched in such a way as to achieve a desired and acceptable level of $SO_2$ venting through line 79.

One advantage of the integrated system embodiment is derived from the fact that the catalytic converter 62 is not burdened by recycled $SO_2$ from the molecular sieve adsorption beds 76 or 69 and, thus is able to utilize all of the sulfur dioxide derived from the ore smelting operation as originally designed. In addition, the concentration of $SO_2$ in the effluent from auxiliary acid absorber 83 of the "double absorption" system is not increased.

It is not necessary that the auxiliary catalytic converter be a part of another contact process system. Again, with reference to FIG. 3, the oxygen-containing $SO_2$ gas stream entering converter 81, through line 78 can be the only source of $SO_2$ fed to catalytic converter 81. Such an arrangement takes advantage of the ability of the molecular sieve adsorption system to concentrate the $SO_2$ from a stack gas stream and, thus permit its conversion to sulfuric acid more efficiently and with less loss to the atmosphere.

It will be readily apparent to those skilled in the art that numerous modifications of the generic process designs are possible without departing from the proper scope of this invention. For example, when oxygen is available from an air rectification plant, there is no need to dry the oxygen stream entering the system. Such an oxygen stream is ideally employed as all or part of the purge gas used to desorb $SO_2$ and water from the molecular sieve beds and recycle to a catalytic converter unit.

What is claimed is:

1. In the process for preparing sulfuric acid wherein sulfur dioxide and oxygen are reacted in the presence of a solid catalyst to form sulfur trioxide and thereafter sulfur trioxide and unreacted sulfur dioxide are contacted in an acid absorber with aqueous sulfuric acid to convert the sulfur trioxide to sulfuric acid, and passing an effluent gas stream from said acid adsorber, said gas stream comprising sulfur dioxide, oxygen and water vapor, the improvement which comprises passing the said effluent gas stream from the said acid absorber into a fixed bed of crystalline zeolitic molecular sieve having pore diameter of at least 4 Angstroms, selectively adsorbing sulfur dioxide and water on said molecular sieve, desorbing sulfur dioxide from said molecular sieve by purging the fixed bed by countercurrently passing therethrough a stream of oxygen-containing non-sorbable purge gas containing less than 100 ppm water vapor and being at a temperature higher than that of the effluent gas stream from the said acid absorber, and thereafter reacting at least some of the said desorbed sulfur dioxide with oxygen to form sulfur trioxide and converting said sulfur trioxide to sulfuric acid by contact and reaction with water.

2. Process according to claim 1 wherein the sulfur dioxide desorbed from the fixed bed of zeolitic molecular sieve is recycled to the same catalytic converter from which it previously issued.

3. Process according to claim 1 wherein the sulfur dioxide desorbed from the fixed bed of zeolitic molecular sieve is recycled to a catalytic converter different from that from which it previously issued.

4. Process according to claim 2 wherein the heated oxygen-containing purge gas comprises a gas stream having essentially the same composition as the gas stream effluent from said molecular sieve fixed bed during the period when the sulfur dioxide and water to be purged therefrom were adsorbed thereon.

* * * * *